United States Patent
Shimada

(10) Patent No.: US 10,228,553 B2
(45) Date of Patent: Mar. 12, 2019

(54) MICROSCOPE DEVICE

(71) Applicant: OLYMPUS CORPORATION, Hachioji-shi, Tokyo (JP)

(72) Inventor: Yoshihiro Shimada, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/821,605

(22) Filed: Nov. 22, 2017

(65) Prior Publication Data

US 2018/0224648 A1  Aug. 9, 2018

(30) Foreign Application Priority Data

Feb. 9, 2017  (JP) ................. 2017-022291

(51) Int. Cl.
| | |
|---|---|
| *G02B 21/26* | (2006.01) |
| *G02B 21/36* | (2006.01) |
| *G02B 21/33* | (2006.01) |
| *G02B 21/00* | (2006.01) |
| *G02B 21/24* | (2006.01) |
| *G02B 21/06* | (2006.01) |

(52) U.S. Cl.
CPC ......... *G02B 21/26* (2013.01); *G02B 21/0032* (2013.01); *G02B 21/0076* (2013.01); *G02B 21/24* (2013.01); *G02B 21/33* (2013.01); *G02B 21/36* (2013.01); *G02B 21/367* (2013.01); *G02B 21/06* (2013.01)

(58) Field of Classification Search
CPC ............ G02B 21/26; G02B 21/0032; G02B 21/0076; G02B 21/24; G02B 21/33; G02B 21/36
USPC ........................................... 348/76
See application file for complete search history.

(56) References Cited

U.S. PATENT DOCUMENTS

| | | |
|---|---|---|
| 2006/0033987 A1 | 2/2006 | Stelzer et al. |
| 2007/0109633 A1 | 5/2007 | Stelzer |
| 2009/0225413 A1 | 9/2009 | Stelzer et al. |
| 2010/0239138 A1 | 9/2010 | Lippert et al. |
| 2012/0282667 A1 | 11/2012 | Lippert et al. |
| 2014/0042339 A1 | 2/2014 | Stelzer et al. |
| 2015/0309294 A1 | 10/2015 | Stelzer |

FOREIGN PATENT DOCUMENTS

| | | |
|---|---|---|
| JP | 2006509246 A | 3/2006 |
| JP | 2010541023 A | 12/2010 |
| WO | 2004053558 A1 | 6/2004 |
| WO | 2009049740 A1 | 4/2009 |

*Primary Examiner* — Nguyen T Truong
(74) *Attorney, Agent, or Firm* — Holtz, Holtz & Volek PC

(57) ABSTRACT

A microscope device 100 includes: a sample container holder 7 that is capable of housing a plurality of sample containers 9 and that is supported so as to be attachable, each of the sample containers 9 housing a sample S and a first immersion medium and including a transparent section that transmits light; an illumination optical system 1 that emits illumination light to the sample S via the transparent section; a detection optical system 2 that detects light from the sample S via the transparent section; and a movement mechanism 16 that relatively moves the sample container holder 7, the detection optical system 2, and the illumination optical system 1 in a gravity direction. The sample container holder 7 houses the plurality of sample containers S in the gravity direction.

10 Claims, 7 Drawing Sheets

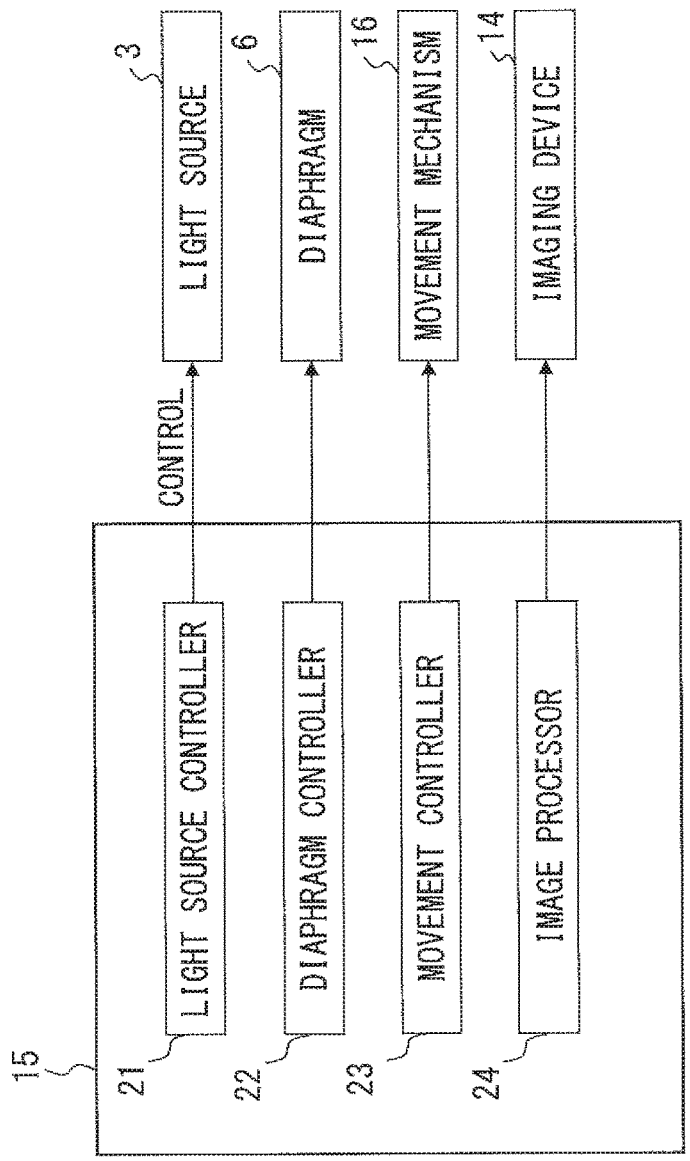
F I G. 3

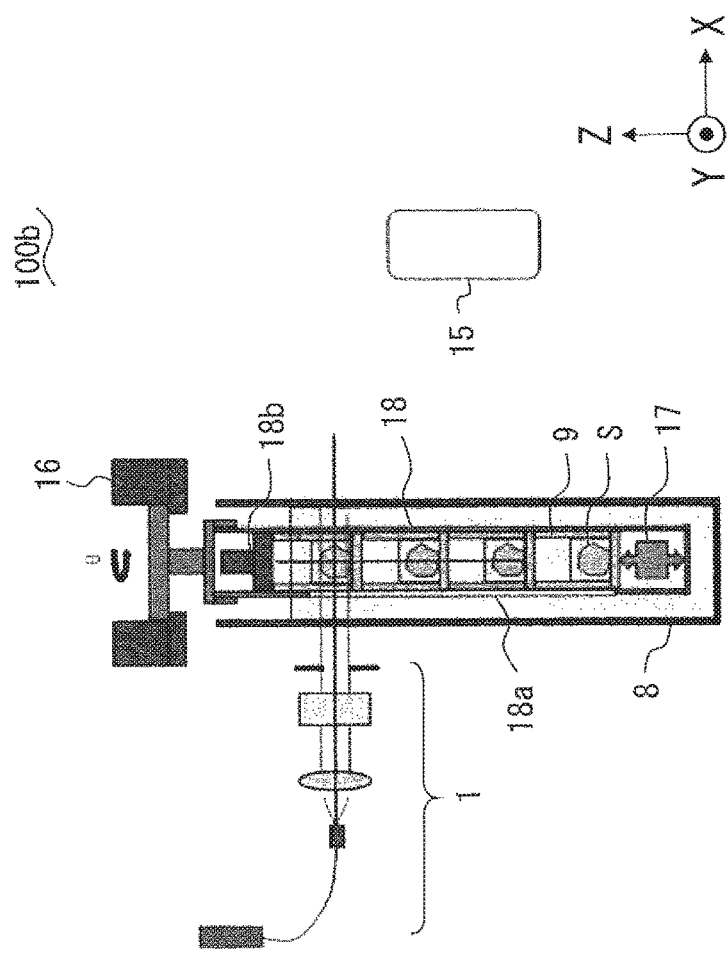
F I G. 4

MICROSCOPE DEVICE

CROSS REFERENCE TO RELATED APPLICATIONS

This application is based upon and claims the benefit of priority from the prior Japanese Patent Application No. 2017-022291, filed Feb. 9, 2017, the entire contents of which are incorporated herein by this reference.

BACKGROUND OF THE INVENTION

Field of the Invention

The present invention relates to a microscope device that observes a plurality of biological specimens.

Description of the Related Art

Conventionally, selective plane illumination microscopy (SPIM), which is an observation method using a microscope device that has a configuration in which an illumination optical axis and a detection optical axis are orthogonal to each other, is known. It can be said that SPIM is a method that is suitable for the observation of biological specimens because less illumination light is applied to a portion other than an observation surface and phototoxicity is suppressed. Examples of a document that discloses a technology using SPIM include Japanese National Publication of International Patent Application No. 2006-509246 and Japanese National Publication of International Patent Application No. 2010-541023.

In recent years, using the SPIM technology to obtain a stereoscopic image of a biological specimen in drug discovery screening in which a stereoscopic image of a three-dimensional cultured cell, such as a spheroid or an organoid (an artificial organ or a portion of the artificial organ), is obtained and image analysis is performed on the stereoscopic image such that drug efficacy is evaluated has also been considered.

SUMMARY OF THE INVENTION

A microscope device in one aspect of the present invention is a microscope that includes: a sample container holder that is capable of housing a plurality of sample containers and that is supported so as to be attachable, each of the sample containers housing a sample and a first immersion medium and including a transparent section that transmits light; an illumination optical system that emits illumination light to the sample via the transparent section; a detection optical system that detects light from the sample via the transparent section; and a movement mechanism that relatively moves the sample container holder, the detection optical system, and the illumination optical system in a first direction that is orthogonal to an optical axis of the illumination optical system and that is orthogonal to the optical axis of the detection optical system, the first direction being a gravity direction when the microscope device is mounted on a horizontal mounting surface. The sample container holder stacks and houses the plurality of sample containers in the first direction.

BRIEF DESCRIPTION OF THE DRAWINGS

The present invention will be more apparent from the following detailed description when the accompanying drawings are referenced.

FIG. 3 illustrates a functional configuration of a controller.

FIG. 4 illustrates a portion of the configuration of a variation of the microscope device.

DESCRIPTION OF THE EMBODIMENTS

In drug discovery screening, a plurality of biological specimens are continuously imaged, and therefore, when the SPIM technology is applied to drug discovery screening, it is required to be able to efficiently image the plurality of biological specimens.

Conventionally, when a plurality of biological specimens are imaged using SPIM, a method for housing the plurality of biological specimens in a multi-well plate and imaging a biological specimen in each well is considered, for example. In order to image all of the plurality of biological specimens housed in the plate, it is requested that a movement space having four times the area of the multi-well plate be secured. Such a method above is not suitable for a device configuration that aims at screening in which an occupied space may be restricted.

In addition, Patent Document 2 discloses a method for imaging a plurality of biological specimens by enclosing the plurality of biological specimens in agarose gel or by bonding the plurality of biological specimens to a rod. A task of enclosing the plurality of biological specimens in the gel and a task of bonding the plurality of biological specimens to the rod cannot be performed using an existing dispenser, a conveyance robot, or the like because a liquid medium is not used, and it is difficult to improve the efficiency of the tasks.

In view of the foregoing, it is an object of the present invention to provide a technology for efficiently imaging a plurality of biological specimens.

Figure 1:
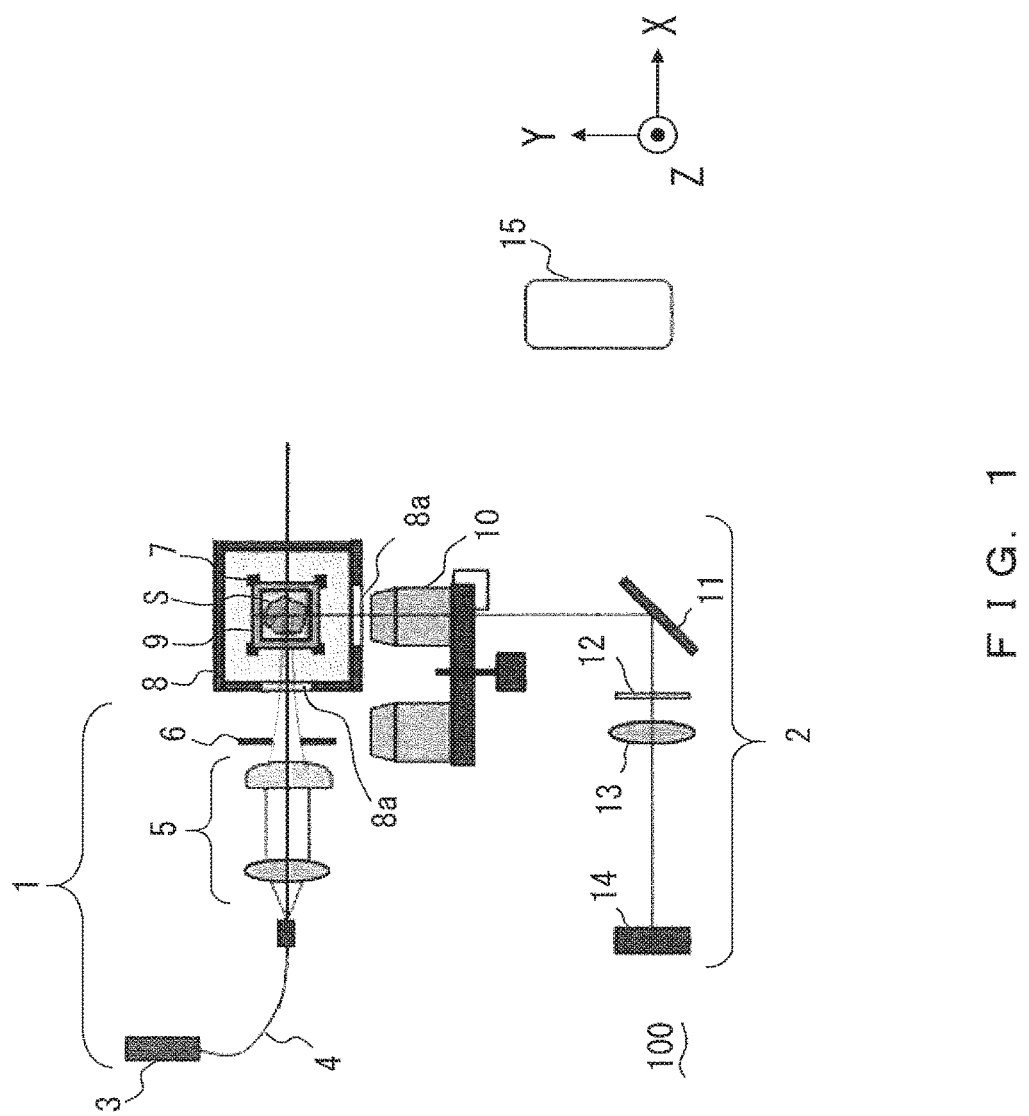
FIG. 1 illustrates the configuration of a microscope device according to a first embodiment.

A microscope device according to a first embodiment of the present invention is described with reference to the drawings. FIG. 1 illustrates the configuration of a microscope device 100 according to the first embodiment. The microscope device 100 is a sheet illumination microscope that illuminates a sample S that is a biological specimen with a light flux formed in a sheet shape (hereinafter referred to as a light sheet).

The microscope device 100 includes an illumination optical system 1, a detection optical system 2, a sample container holder 7, a medium container 8, a movement mechanism 16 (not illustrated in FIG. 1) to which the sample container holder 7 is attachable, and a controller 15. The sample container holder 7 is a holder that can house a plurality of sample containers 9 that house different samples S, and details of the sample container holder 7 will be described later. The microscope device 100 illuminates the sample S in the sample container holder 7 by using the illumination optical system 1, and detects light from the sample S by using the detection optical system 2 such that the sample S is observed. In addition, assume that a direction of the optical axis of the illumination optical system 1 is an X-direction, that a direction of the optical axis of the detection optical system 2 that is orthogonal to the X-direction is a Y-direction, and that a direction that is orthogonal to the X-direction and the Y-direction is a Z-direction, as illustrated in FIG. 1. In the subsequent drawings, directions that correspond to the directions illustrated in FIG. 1 are indicated.

The illumination optical system 1 includes a light source 3, an optical fiber 4, a lens group 5, and a diaphragm 6. The light source 3 is a light source that emits excitation light for illuminating the sample S. The excitation light is guided to the lens group 5 via the optical fiber 4. The lens group 5 forms a light sheet in such a way that the excitation light is applied to the sample S in the sample container 9 housed in the sample container holder 7.

Figure 2:
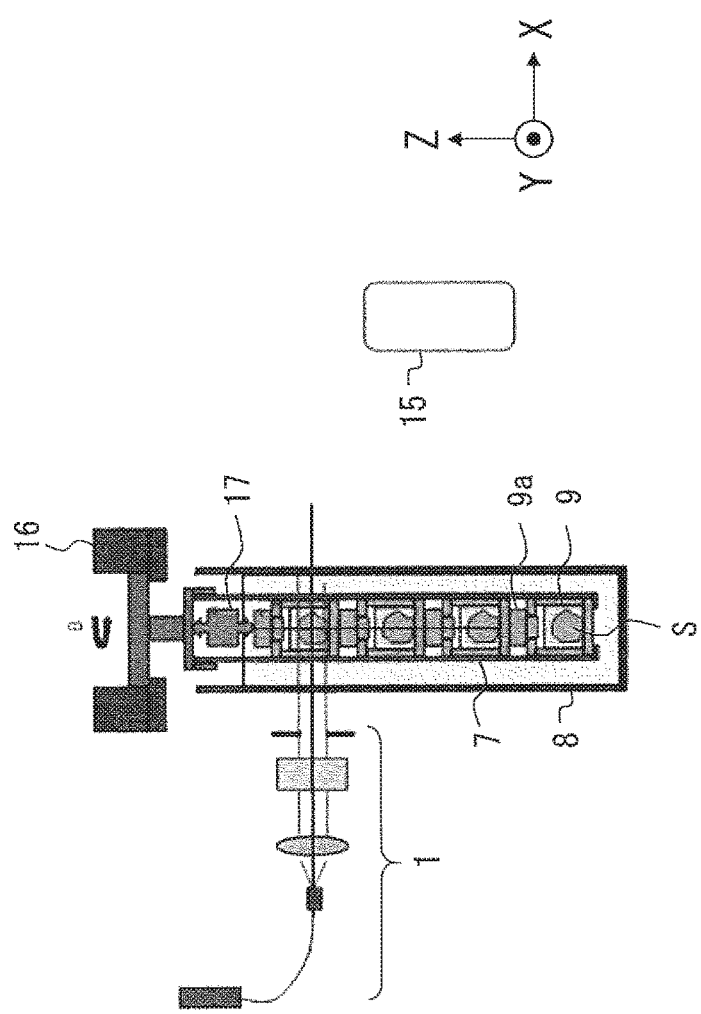
FIG. 2 illustrates a portion of the configuration of the microscope device according to the first embodiment.

FIG. 2 illustrates a portion of the configuration of the microscope device 100 when viewed from a direction that is different from the direction of FIG. 1. The sample container holder 7, the medium container 8, and the movement mechanism 16 are described below with reference to FIG. 2.

The sample container holder 7 is a holder that can house a plurality of sample containers 9 that each house the sample S. The sample container holder 7 has a supporting structure that supports the sample containers 9 from the outside, and the sample container holder 7 houses the plurality of sample containers 9 within the supporting structure in a gravity direction. In this embodiment, the sample container holder 7 has four rods as the supporting mechanism. The sample container holder 7 houses the sample containers 9 by sandwiching the sample containers 9 with the rods and by supporting the bottom of the stacked sample containers 9 using L-shaped structures at the ends of the rods. The sample container holder 7 may have any structure that supports the stacked sample containers 9 from the outside in such a way that the positions of the sample containers 9 do not change, and the configuration of the sample container holder 7 is not limited to the configuration above. There may be a space between the four rods functioning as the supporting structure and the sample containers 9, and the four rods do not always need to sandwich the sample containers 9.

The gravity direction is a direction in which the gravity is applied when the microscope device 100 is arranged on a horizontal plane, such as a table, in order to use the microscope device 100. Namely, the gravity direction corresponds to a direction that corresponds to the vertical direction under the assumption of the general-purpose use of the microscope device 100. Directions illustrated as the Z-direction in FIG. 1 and FIG. 2 correspond to the gravity direction. The sample container holder 7 is supported so as to be attachable within the microscope device 100, and the sample container holder 7 is attached to or removed from the movement mechanism 16 in this embodiment.

The sample container 9 housed in the sample container holder 7 is a container such as a cuvette, and the sample container 9 functions as a transparent section for which the side transmits light. Namely, the excitation light from the illumination optical system 1 and fluorescence generated from the sample S are guided via the transparent section of the sample container 9. The sample container 9 houses a first immersion medium together with the sample S. As the first immersion medium, a transparentized solution or the like is used that has a function of preventing light from being scattered without preventing a biological specimen from absorbing light and generating fluorescence. In addition, the sample container 9 houses a housed object in an airtight state by using a lid 9a.

The movement mechanism 16 relatively moves the sample container holder 7 and the detection optical system 2 in the gravity direction (the Z-direction) that is orthogonal to the respective optical axes of the illumination optical system 1 and the detection optical system 2 illustrated in FIG. 1. In this embodiment, the movement mechanism 16 is a movable stage that supports the sample container holder 7 so as to be attachable and that moves the sample container holder 7 in the Z-direction. Namely, the movement mechanism 16 functions as means for switching a sample S to be observed via the illumination optical system 1 and the detection optical system 2 from among a plurality of samples stacked in the sample container holder 7 by moving the sample container holder 7 in the Z-direction. In addition, the movement mechanism 16 may have a function of moving in the X-direction or the Y-direction.

In the configuration above, the movement mechanism 16 enables plural types of samples housed in the sample container holder 7 to be observed. In particular, a configuration in which the sample containers 9 are housed by being stacked in the gravity direction within the microscope device 100 can reduce a space in comparison with a case in which a plurality of samples are observed using a multi-well plate, as is done conventionally.

In addition, the sample container holder 7 is configured so as to be attachable to the movement mechanism 16. Therefore, a plurality of samples S can be efficiently observed, for example, by preparing a plurality of sample container holders 7, and by repeating a process for removing one of the plurality of sample container holders 7 after all of the samples housed in the sample container holder 7 have been observed and a process for attaching the subsequent sample container holder 7. In particular, these processes can be easily automated by using a robot or the like, and the microscope device 100 enables a plurality of samples S to be efficiently observed.

The medium container 8 stores a second immersion medium having a refractive index that is almost identical to that of the first immersion medium housed in the sample container 9, and the medium container 8 immerses the sample container holder 7 in the second immersion medium. In addition, the medium container 8 includes a transparent section 8a that transmits light, as illustrated in FIG. 1. Stated another way, the excitation light from the illumination optical system 1 is guided to the sample S via the transparent section 8a, the second immersion medium, and the transmission section and the first immersion medium of the sample container 9. The fluorescence from the sample S is guided to an objective 10 via the first immersion medium and the transmission section of the sample container 9, the second immersion medium, and the transparent section 8a. At this time, the second immersion medium has a refractive index that is almost identical to that of the first immersion medium. Therefore, even when the movement mechanism 16 is moved in a direction of the optical axis of the objective 10 (the Y-direction), defocusing and the occurrence of an aberration in the detection optical system 2 are prevented. Similarly, even when the movement mechanism 16 is moved in a direction of the optical axis of the illumination optical system 1 (the X-direction), defocusing and the occurrence of an aberration in the illumination optical system 1 are prevented.

The detection optical system 2 includes the objective 10, a mirror 11, an emission filter 12, a lens 13, and a camera 14. Fluorescence from the sample S that has entered the objective 10 is condensed on the camera 14 via the mirror 11, the emission filter 12, and the lens 13. An objective 10 to be arranged on an optical path may be switched from among a plurality of objectives 10 mounted on a revolver.

FIG. 3 illustrates a functional configuration of the controller 15. The controller 15 is, for example, a computer, and the controller 15 controls components of the microscope device 100. The controller 15 includes a light source controller 21, a diaphragm controller 22, a movement controller 23, and an image processor 24.

The light source controller 21 controls the ON/OFF state, a wavelength, and the like of the light source 3. The diaphragm controller 22 controls the diaphragm 6, and adjusts an exit NA of excitation light to be applied. The movement controller 23 controls a movement in the gravity direction (the Z-direction), a rotational movement, and a movement on the XY plane of the movement mechanism 16. The image processor 24 performs arbitrary image processing on an image captured by the camera 14, outputs the image to a display medium, stores the image in the controller 15, and performs other processing.

A preferred configuration of the microscope device 100 is described below. The movement mechanism 16 may have a function of a rotation mechanism that rotationally moves the sample container holder 7 with the Z-direction as an axis in addition to a function for moving the sample container holder 7 in the Z-direction. By rotationally moving the sample container holder 7, as described above, the orientation of a sample with respect to the illumination optical system 1 can be changed without changing an observation surface. Therefore, fluorescence observation can be performed satisfactorily on the entirety of the sample S.

Conventionally, as means for observing a plurality of samples, a multi-well plate in which a plurality of samples are arranged on the XY plane is used, for example. In this configuration, a detection optical system is arranged on either an upper side or a lower side, and if a rotation mechanism is provided, a rotation axis is located on the XY plane. Accordingly, a sample rolls around in a container due to rotation, and this hinders the observation. In contrast, by employing a configuration in which the samples S are stacked in the gravity direction, as in the present configuration, a rotation mechanism can be added, observation is not hindered, and fluorescence observation can be performed satisfactorily on the entirety of the sample S.

In addition, the sample container holder 7 may include a presser 17 that presses the stacked sample containers 9 from above, as illustrated in FIG. 2. The presser 17 is an elastic body such as a spring, and the presser 17 has an elastic force in the Z-direction so as to press the sample containers 9. As an example, in a case in which an amount of the first immersion medium within each of the sample containers 9 is small and a large buoyancy is applied to each of the sample containers 9 when the sample container holder 7 is immersed in the second immersion medium within the medium container 8, each of the sample containers 9 may float and move within the sample container holder 7. The sample container holder 7 includes the presser 17 such that the sample containers 9 are fixed. Thus, the sample containers 9 can be prevented from moving due to the buoyancy.

In addition, when the sample container holder 7 is moved in the Z-direction by the movement mechanism 16, vibration or shaking may be generated in a device by changing the liquid level of the second immersion medium of the medium container 8 in which the sample container holder 7 is immersed. In order to prevent the liquid level from changing, as described above, it is preferable that the sample container holder 7 and the medium container 8 be configured not to relatively move in the Z-direction. The sample container holder 7 and the medium container 8 can be configured not to relatively move in the Z-direction, for example, by employing a configuration in which both the sample container holder 7 and the medium container 8 are connected to a drive mechanism in the Z-direction of the movement mechanism 16 functioning as a movable stage.

As described above, by employing the microscope device 100, a plurality of samples can be continuously observed, and this results in an increase in efficiency.

A variation of the first embodiment is described below. FIG. 4 illustrates a portion of the configuration of a microscope device 100b, which is a variation. The microscope device 100b is different from the microscope device 100 in that a sample container holder 18 is included instead of the sample container holder 7, and the other configuration is similar to that of the microscope device 100.

The sample container holder 18 includes a supporting structure for which a cross section is a rectangular box shape and a lid 18b, rather than rods. A plurality of sample containers 9 are stacked and housed in the supporting structure. The sample container holder 18 also includes a transparent section 18a. Stated another way, in the microscope device 100b, excitation light from an illumination optical system 1 is guided to a sample S via the transparent section 18a and a transparent section of the sample container 9, and fluorescence from the sample S is guided to a detection optical system 2 via the transparent section 18a and the transparent section of the sample container 9, and detection is performed.

In addition, unlike four rods, the box-shaped supporting structure of the sample container holder 18 covers the interior with no space by using a wall surface and a bottom surface, and therefore the supporting structure houses the sample containers 9 in an airtight state. By employing the configuration above, the second immersion medium does not enter the sample container holder 18. Thus, observation can be performed by using a sample container 9 without a lid.

Further, in the sample container holder 18 in this variation, a presser 17 is provided at the bottom of the supporting structure. The presser 17 may be provided on an upper side or a lower side within the sample container holder.

Figure 5:
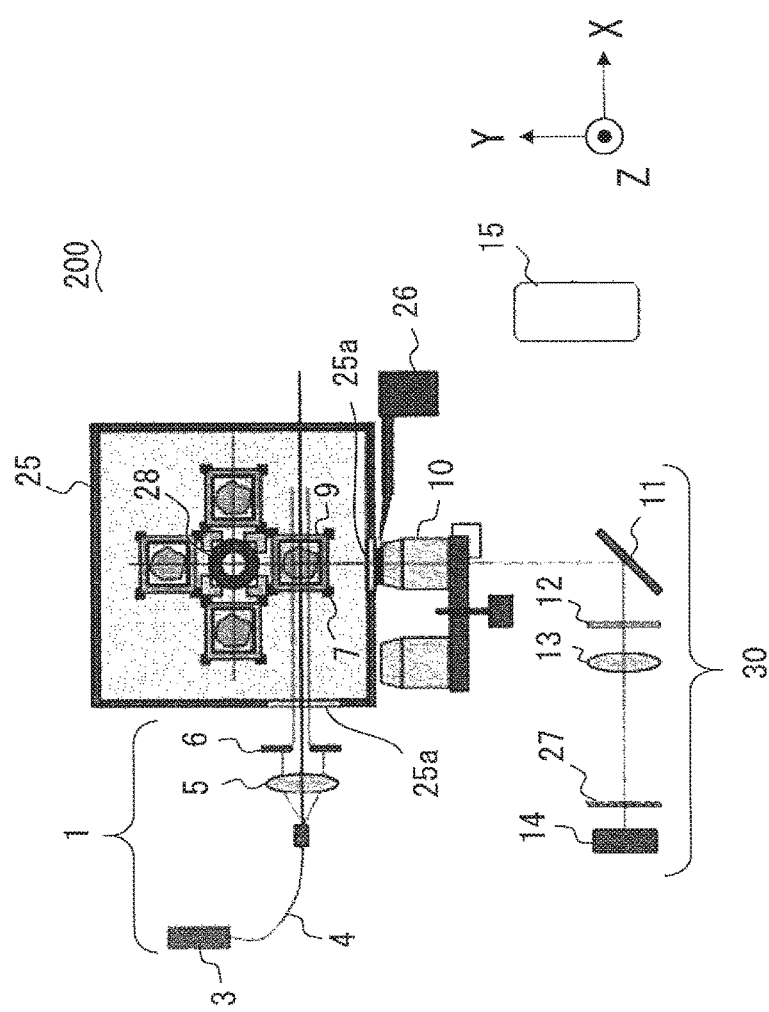
FIG. 5 illustrates the configuration of a microscope device according to a second embodiment.

A microscope device according to a second embodiment of the present invention is described below with reference to the drawings. FIG. 5 illustrates the configuration of a microscope device 200 according to the second embodiment. The microscope device 200 is a light-field microscope, and a light flux that has a thickness in the Z-direction in comparison with the microscope device 100 is applied to a sample S as excitation light.

The microscope device 200 includes an illumination optical system 1, a detection optical system 30, a plurality of sample container holders 7, a medium container 25, a movement mechanism 28 to which each of the plurality of sample container holders 7 is attachable, and a controller 15. The illumination optical system 1 has a configuration that is similar to the configuration described above in the microscope device 100. The detection optical system 30 is different from the detection optical system 2 in that a microlens array 27 is included in an imaging position of a lens 13, and in that a camera 14 is included on a rear side of the microlens array 27.

In the microscope device 200, an immersion medium supplier 26 is further provided, and the immersion medium supplier 26 supplies a third immersion medium between the objective 10, which is an immersion type objective in this embodiment, and the medium container 25. In this case, a drain tank may be included that receives a third immersion medium that has been redundantly supplied by the immersion medium supplier 26.

The functional configuration of the controller 15 is similar to that in the microscope device 100. In this embodiment, the image processor 24 constructs a three-dimensional image from image information acquired by the camera 14.

Figure 6:
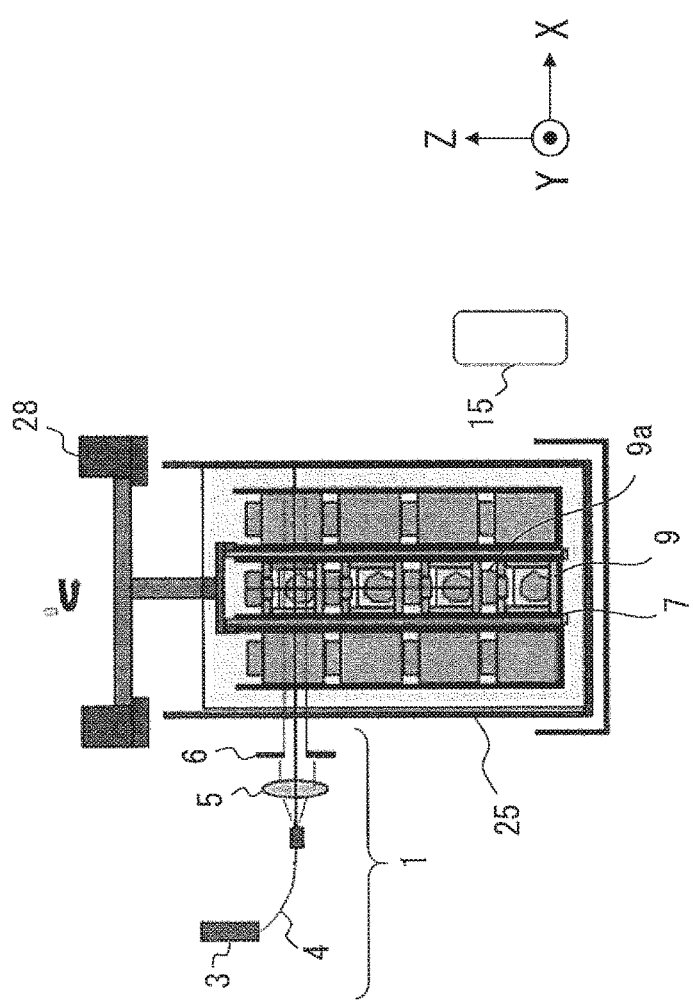
FIG. 6 illustrates a portion of the configuration of the microscope device according to the second embodiment.

FIG. 6 illustrates a portion of the configuration of the microscope device 200 when viewed from a direction different from the direction of FIG. 5. The sample container holders 7, the medium container 25, and the movement mechanism 28 are described below with reference to FIG. 5 and FIG. 6.

Each of the sample container holders 7 is similar to the sample container holder described in the first embodiment. In this embodiment, the plurality of sample container holders 7 are connected around the movement mechanism 28, as illustrated in FIG. 5. More specifically, the plurality of sample container holders 7 are provided on the circumference with the Z-direction as a center. The movement mechanism 28 moves in the Z-direction and rotationally moves with a Z-direction axis as a center. The sample container holders 7 are provided in such a way that a sample container holder 7 to be arranged on the optical paths of the illumination optical system 1 and the detection optical system 30 is switched due to the rotational movement of the movement mechanism 28.

Due to the movement of the movement mechanism 28 in the Z-direction, a sample S to be observed is switched from among samples housed in a single sample container holder 7. Due to the rotational movement of the movement mechanism 28, the arrangement of the sample container holders 7 connected around the movement mechanism 28 is changed, and a sample container holder 7 that houses a sample to be observed by the illumination optical system 1 and the detection optical system 30 is switched. The movement mechanism 28 does not apply only to move in the Z-direction or to rotationally move, and the movement mechanism 28 may move in the X-direction and the Y-direction.

Each of the sample container holders 7 is immersed in a second immersion medium housed in the medium container 25, and the second immersion medium has a refractive index that is almost identical to that of the first immersion medium housed in the sample container 9. Therefore, even when the movement mechanism 28 is moved in a direction of the optical axis of the objective 10 (the Y-direction), defocusing and the occurrence of an aberration in the detection optical system 30 can be prevented. Similarly, even when the movement mechanism 28 is moved in a direction of the optical axis of the illumination optical system 1 (the X-direction), defocusing and the occurrence of an aberration in the illumination optical system 1 can be prevented.

The medium container 25 has a transparent section 25a that transmits light, as illustrated in FIG. 5. The transparent section 25a has a function similar to that of the transparent section 8a of the medium container 8.

By employing the microscope device 200 described above, similarly, a plurality of samples can be continuously observed, and efficiency can be improved. In addition, by employing a configuration in which a plurality of sample container holders 7 are provided, a corresponding number of processes for attaching or removing the sample container holder 7 that corresponds to the number of the sample container holders 7 can be simultaneously performed, and observation can be performed more efficiently.

Figure 7:
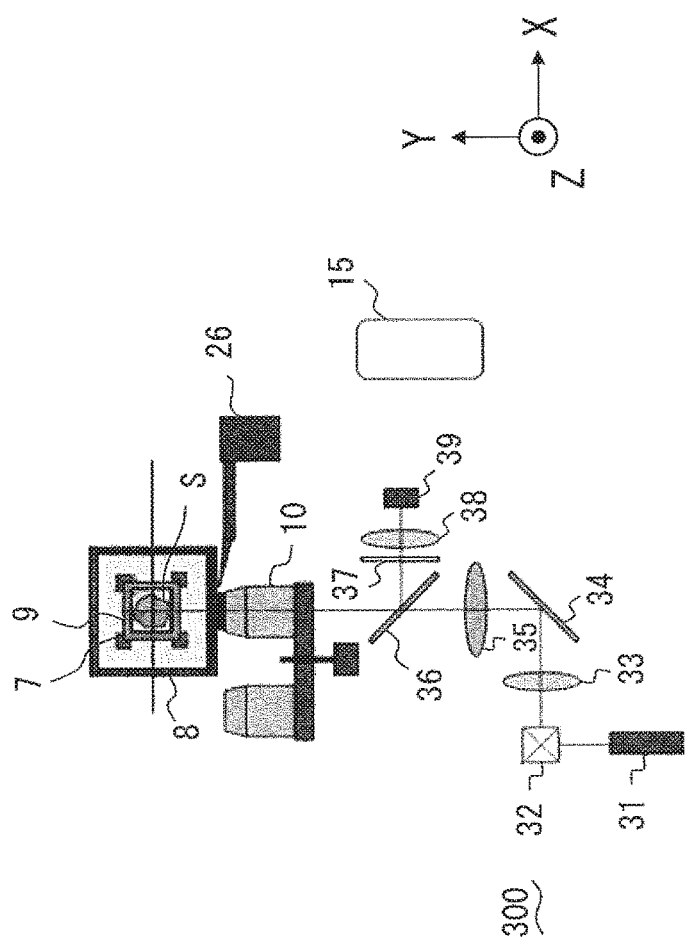
FIG. 7 illustrates the configuration of a microscope device according to a third embodiment.

A microscope device according to a third embodiment of the present invention is described below with reference to the drawings. FIG. 7 illustrates the configuration of a microscope device 300 according to the third embodiment. The microscope device 300 is a multi-photon excitation microscope. Unlike the microscope device 100 and the microscope device 200, the microscope device 300 includes a vertical optical path.

The microscope device 300 includes a light source 31, a scanner 32, a lens 33, a mirror 34, a lens 35, a dichroic mirror 36, an objective 10, an emission filter 37, a condenser lens 38, a photodetector 39, a sample container holder 7, a medium container 8, an immersion medium supplier 26, a movement mechanism 16 (not illustrated in FIG. 7), and a controller 15.

The medium container 8, the sample container holder 7, and the movement mechanism 16 have configurations that are similar to the configurations in the microscope device 100 described in the first embodiment.

The light source 31 outputs an ultra-short pulse laser (hereinafter referred to as a laser beam). The scanner 32 scans the laser beam from the light source 31. The scanner 32 scans the laser beam such that a position in which the laser beam is applied to a sample S via the objective 10 is changed in the XZ direction. The laser beam is guided to the objective 10 via the lens 33, the mirror 34, the lens 35, and the dichroic mirror 36. The dichroic mirror 36 is designed so as to transmit the laser beam and to reflect fluorescence from the sample S.

The objective 10 is an immersion type objective, as described in the second embodiment, and the objective 10 is supplied with a third immersion medium from the immersion medium supplier 26 as needed. A drain tank may be included that receives a third immersion medium that has been redundantly supplied by the immersion medium supplier 26. The objective 10 irradiates the laser beam via a transparent section 8a (not illustrated in FIG. 7) of the medium container 8, a second immersion medium, a transmission section of a sample container 9, and a first immersion medium, and detects fluorescence through the sample route. The fluorescence collected by the objective 10 is reflected by the dichroic mirror 36, and is condensed by the photodetector 39 via the emission filter 37 and the condenser lens 38. The controller 15 is similar to the controller described in the first embodiment.

By employing the microscope device 300 having the configuration above, similarly, a plurality of samples can be continuously observed, and efficiency can be improved. In particular, by employing a configuration in which the movement mechanism 16 performs a rotational movement with the Z-direction as an axis, as described in the first embodiment, fluorescence observation can be performed satisfactorily on the entirety of the sample S, and a three-dimensional image with a high resolution can be constructed.

As described above, according to the present invention, a technology for efficiently imaging a plurality of biological specimens can be provided.

The embodiments described above give specific examples in order to make the invention easily understandable, and the present invention is not limited to the embodiments described above. Various modifications or variations can be made to the microscope devices described above without departing from the scope of the present invention specified in the claims.

What is claimed is:
1. A microscope device comprising:
   a sample container holder that is capable of housing a plurality of sample containers and that is supported so as to be attachable, each of the sample containers housing a sample and a first immersion medium and including a transparent section that transmits light;

an illumination optical system that emits illumination light to the sample via the transparent section;

a detection optical system that detects light from the sample via the transparent section; and a movement mechanism that relatively moves the sample container holder, the detection optical system, and the illumination optical system in a first direction that is orthogonal to an optical axis of the illumination optical system and that is orthogonal to the optical axis of the detection optical system, the first direction being a gravity direction when the microscope device is mounted on a horizontal mounting surface, wherein the sample container holder stacks and houses the plurality of sample containers in the first direction.

2. The microscope device according to claim 1, further comprising:

a medium container that stores a second immersion medium that has a refractive index that is almost identical to that of the first immersion medium, and that immerses the sample holder with the second immersion medium, wherein the medium container includes a second transparent section that transmits light, the illumination optical system emits the illumination light to the sample via the second transparent section and the transparent section, and the detection optical system detects the light from the sample via the second transparent section and the transparent section.

3. The microscope device according to claim 2, wherein the sample container holder and the medium container are configured so as not to relatively move in the first direction.

4. The microscope device according to claim 3, wherein the movement mechanism is connected to the sample container holder and the medium container.

5. The microscope device according to claim 1, further comprising:

a second movement mechanism that rotationally moves the sample container holder with the first direction as an axis.

6. The microscope device according to claim 1, further comprising:

a presser that presses, in the first direction, the plurality of sample containers that have been stacked in the first direction and have been housed in the sample container holder.

7. The microscope device according to claim 6, wherein the presser includes an elastic body, and the plurality of sample containers are pressed in the first direction by using an elastic force of the elastic body.

8. The microscope device according to claim 1, wherein the sample container holder includes a third transparent section, and houses the plurality of sample containers in an airtight state, the illumination optical system emits the illumination light to the sample via the third transparent section and the transparent section, and the detection optical system detects the light from the sample via the third transparent section and the transparent section.

9. The microscope device according to claim 1, further comprising:

a third movement mechanism that rotationally moves with an axis of the first direction as a center; and a plurality of the sample container holders, wherein the sample container holder to be arranged on optical paths of the illumination optical system and the detection optical system is switched from among the plurality of the sample container holders due to a movement of the third movement mechanism.

10. The microscope device according to claim 1, wherein the illumination optical system emits the illumination light to the sample from a second direction that is orthogonal to both the first direction and a direction of the optical axis of the detection optical system.

* * * * *